United States Patent [19]

Boelter

[11] 3,794,938

[45] Feb. 26, 1974

[54] COUPLED BANDSTOP/BANDPASS FILTER

[75] Inventor: Donald A. Boelter, Indianapolis, Ind.

[73] Assignee: General Aviation Electronics, Inc., Indianapolis, Ind.

[22] Filed: May 3, 1971

[21] Appl. No.: 139,639

[52] U.S. Cl. .................................. 333/70 R, 333/77

[51] Int. Cl. .......................... H03h 7/08, H03h 7/38

[58] Field of Search .................................. 333/70, 77

[56] References Cited

UNITED STATES PATENTS

| | | | |
|---|---|---|---|
| 1,227,113 | 5/1917 | Campbell | 333/70 R |
| 1,882,631 | 10/1932 | Jaumann | 333/77 X |
| 2,092,709 | 9/1937 | Wheeler | 333/70 R X |
| 2,247,898 | 7/1941 | Wheeler | 333/70 R X |
| 3,530,408 | 9/1970 | Brandon et al. | 333/70 R X |
| 3,316,510 | 4/1967 | Poschenrieder | 333/70 |
| 3,517,342 | 6/1970 | Orchard | 333/24 |
| 3,560,894 | 2/1971 | Fettweis | 333/72 |
| 1,493,600 | 5/1924 | Campbell | 333/70 |
| 3,514,727 | 5/1970 | Matsumoto | 333/70 |
| 3,579,154 | 5/1971 | Deen | 333/76 |

FOREIGN PATENTS OR APPLICATIONS

| | | | |
|---|---|---|---|
| 677,862 | 8/1952 | Great Britain | 333/70 R |

OTHER PUBLICATIONS

Henney, K., Editor-in-Chief, "The Radio Engineering Hand Book," 3rd Edition, 1941, McGraw-Hill pp. 171–173

*Primary Examiner*—Rudolph V. Rolinec
*Assistant Examiner*—Wm. H. Punter
*Attorney, Agent, or Firm*—Woodard, Weikart, Emhardt & Naughton

[57] ABSTRACT

This disclosure includes a four pole bandstop filter coupled to a five pole bandpass filter tuned to an adjacent band to achieve a very steep attenuation curve between the two bands and an increased bandstop width.

1 Claim, 2 Drawing Figures

PATENTED FEB 26 1974 3,794,938

INVENTOR
DONALD A. BOELTER
BY
Woodard, Weikart, Emhardt & Naughton
ATTORNEYS

COUPLED BANDSTOP/BANDPASS FILTER

BACKGROUND OF THE INVENTION

1. Field of the Invention

This invention relates to electrical filter networks for radio frequency signals.

2. Description of the Prior Art

In the Alpha/200 aircraft radio manufactured by General Aviation, Inc., Indianapolis, Indiana, a conventional 5-pole capacitively coupled bandpass filter has been used as a front end filter to pass an entire band of frequencies (108.0 to 127.9 MHz). To correct a problem of interference from FM broadcast stations, a two pole capacitively coupled bandstop filter was added between the receiver and the antenna. This two pole filter had a bandwidth of about 2 to 3 MHz and could be tuned to any FM frequency (105 MHz or below) depending upon the frequency of the most undesirable FM station in the area where the receiver was to be used. Due to the fact that aircraft fly in many areas and near many FM stations, this limitation in bandstop bandwidth limited the value of the bandstop filter in correcting the problem of FM broadcast station interference.

SUMMARY OF THE INVENTION

This invention relates to a bandstop filter having at least three series resonant circuits connected to a bandpass filter having at least two parallel resonant circuits. The bandstop filter is tuned to a band adjacent to the passband of the bandpass filter. As a result of this invention, effective FM suppression over the entire FM band can be provided, and the attenuation curve between the two bands can be made very steep.

DESCRIPTION OF THE PREFERRED EMBODIMENT

Figure 1:
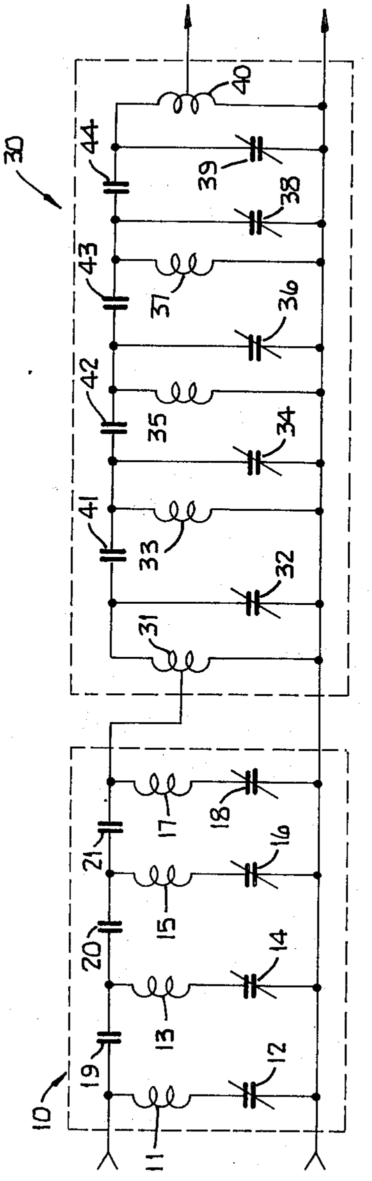
FIG. 1 is an illustration of the preferred embodiment of the filter of this invention.

Referring particularly to FIG. 1, there is illustrated a 4-pole bandstop filter 10 which couples to a 5-pole bandpass filter 30. The 4-pole bandstop filter 10 consists of four series resonant circuits (11 and 12, 13 and 14, 15 and 16, and 17 and 18) coupled by capacitors

19, 20 and 21. The 5-pole bandpass filter 30 consists of five parallel resonant circuits (31 and 32, 33 and 34, 35 and 36, 37 and 38, and 39 and 40) coupled by capacitors 41, 42, 43, and 44. The connections to the bandpass filter 30 are made to taps on inductors 31 and 40 to obtain optimum coupling.

The bandpass filter 30 is tuned to pass the aircraft frequencies from 108.0 to 127.9 MHz, while the bandstop filter is tuned to stop FM frequencies from 88.1 to 107.9. The 4-pole bandstop filter 10 if tested alone would have a bandstop width of about 6 MHz, but when connected to the bandpass filter 30 the bandstop width increases to nearly 20 MHz and provides effective FM suppression over the entire FM band. The attenuation curve between the two bands becomes quite steep.

Figure 2:
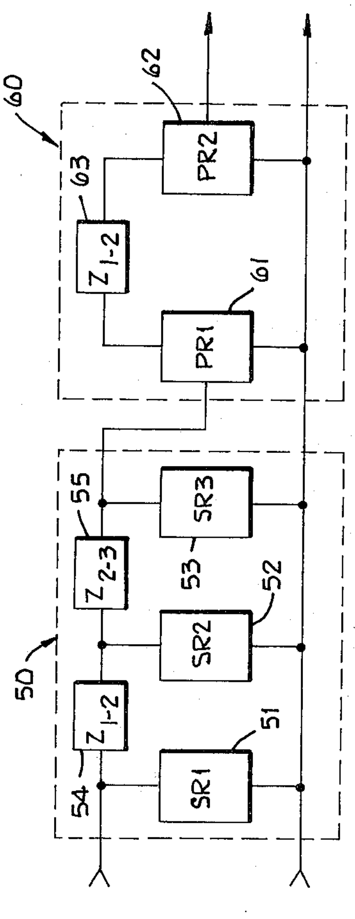
FIG. 2 is a block diagram illustrating variations of the invention.

Variations in this circuit are possible without significant loss of the increased bandstop width and improved slope of the attenuation curve. FIG. 2 illustrates the minimum number of elements necessary to achieve the improved results. The bandstop filter 50 connects to a bandpass filter 60 tuned to an adjacent band just as in FIG. 1. The bandstop filter includes 3 series resonant circuits 51, 52, and 53 coupled together by impedances 54 and 55 which may be resistive, capacitive, or inductive. The bandpass filter 60 includes 2 parallel resonant circuits 61 and 62 coupled together by impedance 63 which may be resistive, capacitive, or inductive. Although the resonant circuits illustrated herein are made with inductors and capacitors, it is intended that equivalently functioning items such as cavity resonators or crystals be encompassed in the term resonant circuit, it being the effect which is important.

I claim:

1. An electrical ladder-type filter which comprises a. a bandstop filter having four series resonant circuits in transverse branches and connected to a common point, and capacitors to couple between pairs of series resonant circuits, and b. a bandpass filter coupled to said bandstop filter and having 5 parallel resonant circuits in transverse branches, said bandpass filter having a capacitor to couple between two of the parallel resonant circuits, said bandstop filter being tuned to a band adjacent to the passband of said bandpass filter, and wherein one of said parallel resonant circuits includes a tapped inductor and the bandstop filter connects to the tap on said tapped inductor.

* * * * *